United States Patent [19]

Said et al.

[11] 3,898,329

[45] Aug. 5, 1975

[54] VASOACTIVE INTESTINAL PEPTIDE, COMPOSITION AND METHOD

[76] Inventors: Sami I. Said, 5323 Harry Hines Blvd., Dallas, Tex. 75235; Viktor Mutt, 17156 Jungfrudansen, Solna, Sweden

[22] Filed: Nov. 20, 1973

[21] Appl. No.: 417,488

Related U.S. Application Data

[63] Continuation-in-part of Ser. No. 181,444, Sept. 17, 1971.

[52] U.S. Cl. ................................................. 424/177
[51] Int. Cl. ..................... A61k 37/00; C07c 103/52
[58] Field of Search.................. 424/177; 260/112.5

[56] References Cited
OTHER PUBLICATIONS

Said et al.; Science, 169, 1217–1218, (1970).

*Primary Examiner*—Lewis Gotts
*Assistant Examiner*—Reginald J. Suyat
*Attorney, Agent, or Firm*—Lowe, King & Price

[57] ABSTRACT

A method for producing therapeutic biological actions including systemic vasodilation, hypotension, increased cardiac output, respiratory stimulation, hyperglycemia, coronary dilation and bronchodilation in animals and humans by treatment with a vasoactive intestinal polypeptide, V.I.P., which exhibits the following amino acid sequence:

L-His-L-Ser-L-Asp-L-Ala-L-Val-L-Phe-L-Thr-L-Asp-L-Asn-L-Tyr-L-Thr-L-Arg-L-Leu-L-Arg-L-Lys-L-Gln-L-Met-L-Ala-L-Val-L-Lys-L-Lys-L-Tyr-L-Leu-L-Asn-L-Ser-L-Ile-L-Leu-L-Asn-$NH_2$

Therapeutic biological actions may be produced in animals and humans by intravenous injection by 0.02–10 µg of V.I.P. per kg of body weight. V.I.P. may also be administered by other methods which usually is dictated by the area of use. Also provided are novel compositions for use in method.

14 Claims, 4 Drawing Figures

3,898,329

VASOACTIVE INTESTINAL PEPTIDE, COMPOSITION AND METHOD

The invention described herein was made in the course of work conducted under a grant or award from the United States Department of Health, Education and Welfare.

REFERENCES TO RELATED APPLICATIONS

This application is a continuation-in-part of copending U.S. application Ser. No. 181,444, filed Sept. 17, 1971, and is related to U.S. application Ser. No. 335,976, filed Feb. 26, 1973 now abandoned. This application is also related to our copending application Ser. No. 417,605, filed Nov. 20, 1973.

BACKGROUND OF THE INVENTION

This invention relates generally to a new polypeptide, its biological actions, and therapeutic usefulness. More particularly, the present invention relates to new polypeptide isolated from the intestines of mammals by means of new purification procedures and the wide-range of activity of the polypeptide affecting cardiovascular, respiratory and metabolic functions.

It is well-known that polypeptide hormones regulate many physiologic functions and mediate certain pathological responses. While numerous compounds have been known to possess a vasodilator effect, many possess this effect only to a relatively slight degree or for a very short time. Medical science has, therefore, sought materials exhibiting a more potent or sustained vasodilator effect and which would be more useful therapeutic agents.

SUMMARY OF THE INVENTION

It is the principal object of the present invention to provide a new polypeptide exhibiting such biological actions.

It is also an object of the present invention to provide a new polypeptide exhibiting activity as a systemic vasodilator, hypotensive, cardiac output increaser, respiratory stimulator, coronary dilator, and bronchodilator as well as a producer of hyperglycemia.

This invention also has as an object the provision of therapeutic compositions and methods for the administration of the compositions to animals or humans to affect biological activity therein.

In satisfaction of the foregoing objects and advantages, there is provided by this invention a therapeutic composition comprising Vasoactive Intestinal Peptide (V.I.P.) having the following structure:

L-His-L-Ser-L-Asp-L-Ala-L-Val-L-Phe-L-Thr-L-Asp-L-Asn-L-Tyr-L-Thr-L-Arg-L-Leu-L-Arg-L-Lys-L-Gln-L-Met-L-Ala-L-Val-L-Lys-L-Lys-L-Try-L-Leu-L-Asn-L-Ser-L-Ile-L-Leu-L-Asn-NH$_2$ and a carrier. Also provided are methods for administration of the compositions to animals and humans.

BRIEF DESCRIPTION OF THE DRAWINGS

Reference is now made to the drawings accompanying the application wherein.

Figure 1:
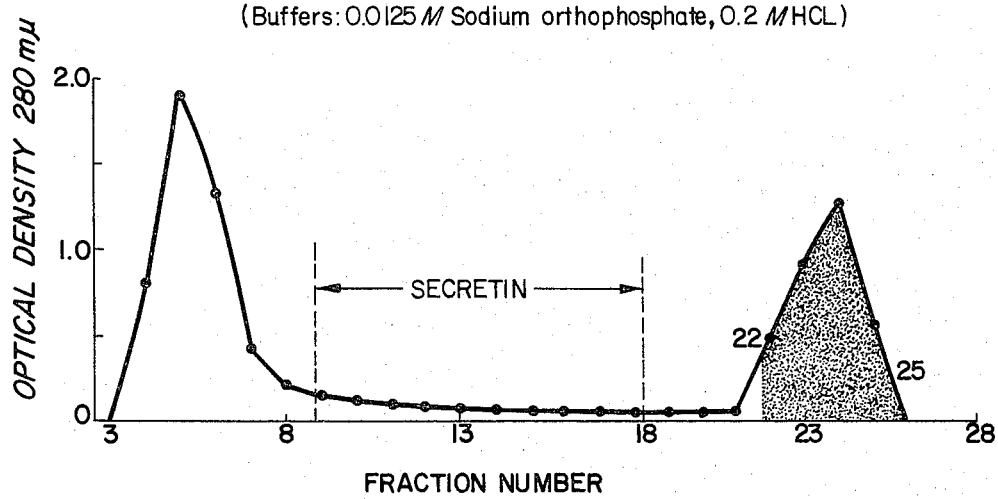
FIGS. 1 through 4 illustrate the plottings of optical density versus fraction number as obtained in accordance with the various chromatography and countercurrent distribution procedures.

THE STRUCTURE OF V.I.P.

The following sequence has been established for the Vasoactive Intestinal Peptide:

L-His-L-Ser-L-Asp-L-Ala-L-Val-L-Phe-L-Thr-L-Asp-L-Asn-L-Tyr-L-Thr-L-Arg-L-Leu-L-Arg-L-Lys-L-Gln-L-Met-L-Ala-L-Val-L-Lys-L-Lys-L-Tyr-L-Leu-L-Asn-L-Ser-L-Ile-L-Leu-L-Asn-NH$_2$

In the above structure the amino acid components of the peptide are identified by abbreviations for convenience. These abbreviations are as follows:

| Amino Acid | Abbreviated Designation |
|---|---|
| L-methionine | met |
| L-arginine | arg |
| L-alanine | ala |
| L-aspartic acid | asp |
| L-histidine | his |
| L-lysine | lys |
| L-leucine | leu |
| L-phenylalanine | phe |
| L-isoleucine | ile |
| L-asparagine | asn |
| L-serine | ser |
| L-tyrosine | tyr |
| L-threonine | thr |
| L-valine | val |
| L-glutamine | gln |

In parent application Ser. No. 181,444, filed September 17, 1971, V.I.P. was described as having the following sequence:

His (Ala, Asp, Ser, Val). Phe. Thr. (Asx$_2$). Tyr. Thr. Arg. Leu. Arg (Lys, Glx). Met. Ala (Val, Lys, Lys). Tyr. Leu. Asn. Ser. Ile. Leu. Asn. NH$_2$.

wherein Asn is asparagine, Asx is either asparagine or aspartic acid, the subscript 2 means two molecules are present, and Glx is glutamic acid or glutamine.

As pointed out in Ser. No. 181,444, this sequence was based on the following evidence:

Treatment of the peptide with cyanogen bromide cleaves the polypeptide into two fragments, one with N-terminal histidine, like the polypeptide itself, obviously the N-terminal part, denoted VIP-CNBr-N, and the other with N-terminal alanine, the C-terminal VIP-CNBr-C. Chymotrypsin cleaves VIP-CNBr-C into three fragments with the composition:

| | |
|---|---|
| VIP-CNBr-C-N | Ala (lys$_2$, Val).Tyr |
| VIP-CNBr-C-I and | Leu (Asn, Ile, Ser).Leu |
| VIP-CNBr-C-C | Asn.NH$_2$ | where -N stands for N-terminal, -I for intermediate and -C for C-terminal.

VIP-CNBr-N was cleaved by chymotrypsin into 4 peptides which were arranged in the order in which they occur in the intact VIP-CNBr-N, with the aid of the additional information obtained by cleavage of the latter with trypsin. These four peptides are:

| | |
|---|---|
| VIP-CNBr-N-N | His (Ala, Asp, Ser, Val) Phe |
| VIP-CNBr-N-IN | Thr (Asx$_2$) Tyr |

| | -Continued |
|---|---|
| VIP-CNBr-N-I-C | Thr.Arg.Leu |
| VIP-CNBr-N-C | Arg (lys, Glx), Met (recovered as homocysteine) | where -N and -C are explained above, -IN is the intermediate nearest the N-terminus, and -IC is the intermediate nearest the C-terminus. Asn is asparagine, Asx is either asparagine or aspartic acid, Glx is glutamine or glutamic acid and the subscript "2" indicates two molecules.

Since the filing of the parent application, work has continued on determining the specific structure of V.I.P. and this structure is set forth herein since a determination of the structure or sequence has now been made. This determination was made with the use of the enzyme, Kallikrein.

According to this procedure, after cleavage of the polypeptide into two fragments, the N-terminal part, VIP-CNBr-N, is cleaved by kallikrein into the tetradecapeptide, VIP-CNBr-N-KN and the tripeptide, VIP-CNBr-N-KC, where N stands for N-terminal, C stands for C-terminal and K for kallikrein. The tripeptide is identified as Lys-Gln-homoserine and the tetradecapeptide is cleaved by trypsin into the dodecapeptide VIP-CNBr-N-KN-TrN and leucylarginine (=VIP-CNBr-N-KN-TrC). The dodecapeptide is then cleaved by chymotrypsin into the following three peptides.

| VIP-CNBr-N-KN-N | His(Ala,Asp,Ser,Val)Phe |
|---|---|
| VIP-CNBr-N-KN-I | Thr(Asx$_2$)Tyr |
| VIP-CNBr-N-KN-C | Thr.Arg | where -N and -C are as above and I stands for intermediate. VIP-CNBr-N-KN-N and VIP-CNBr-N-KN-I are identical to the above mentioned VIP-CNBr-N-N and VIP-CNBr-N-IN. Asx is either asparagine or aspartic acid and the subscript "2" indicates two molecules.

The determination of the amino acid sequence of the Octacosapeptide V.I.P. was greatly facilitated by the discovery that pancreatic kallikrein preferentially cleaved only one of the three bonds in its N-terminal cyanogen bromide heptadecapeptide that are susceptible to cleavage with trypsin. This discovery, when combined with previous knowledge of the molecule, led to the final determination of the final amino acid sequence.

In the specific procedure used in identifying the sequence of V.I.P., it was discovered that trypsin split V.I.P. into several more fragments than the six that would have been expected if none of its two arginyl and three lysyl residues had been in juxtaposed relationship. Further, free lysine was found in the tryptic fragments which indicated the presence in V.I.P. of an arginyllysyl and/or a lysyl-lysyl linkage. Therefore instead of cleavage with trypsin, the single methionyl bond was cleaved by the cyanogen bromide procedure (Gross et al, Jour. Am. Chem. Soc., 83, 1510, 1961) in initial fragmentation of the molecule. The fragments formed by this procedure were an N-terminal heptadeca- and a C-terminal-undecapeptide.

The resulting heptadecapeptide was found to contain the two arginyl and one of the three lysyl residues of the octacosapeptide, while the remaining two lysyl residues were in the undecapeptide. On degradation of these fragments with trypsin, free lysine was liberated from both fragments indicating the presence of an arginyllysyl linkage in the heptadecapeptide and a lysyllysyl linkage in the undecapeptide. On treatment of the heptadecapeptide with pancreatic kallikrein prepared by the method of Fritz et al. (Hoppe-Seyler's Z, Physiol. Chem. 348, 1120–1132, 1967), it was cleaved selectively at only one of its three trypsin sensitive linkages, the arginyl-lysyl bond, into an N-terminal tetradecapeptide and a C-terminal tripeptide. The tripeptide was found to be lysylglutaminylhomoserine. The tetradecapeptide was then cleanly cleaved by tryspin into an N-terminal dodecapeptide and leucylarginine. The dodecapeptide in turn was cleaved further by chrymotrypsin into (1) an N-terminal hexapeptide, (2) an intermediate tetrapeptide, and (3) a C-terminal dipeptide, the latter being identified as threonylarginine.

The determination of the sequence of (1) the hexapeptide, His-Ser-Asp-Ala-Val-Phe, was determined by cleavage of the hexapeptide with thermolysin into an N-terminal tetrapeptide and valylphenylalanine, followed by cleavage of the tetrapeptide with dipeptidyl aminopeptidase I by the method of McDonald et al, (J. Biol. Chem., 244, 6199–6208, 1969), into histidylserine and aspartylalanine. By treating ther intermediate tetrapeptide (2) with carboxypeptidase A, tyrosine was removed and further brief treatment of the residual tripeptide with aminopeptidase M removed threonine. The residual dipeptide was identifed as aspartylasparagine. Thus the tetrapeptide was Thr-Asp-Asn-Tyr.

The C-terminal undecapeptide from the initial cyanogen bromide fragmentation, was found to have an N-terminal residue of alanine and to be capable of cleavage into three fragments by chymotrypsin. One of these fragments was identified as asparaginylamide and had obviously constituted the C-terminus of the undecapeptide, as well as the octacosapeptide itself. An N-terminal residue of alanine served to identify the fragment which derived from the N-terminus of the undecapeptide. The amino acid sequence of this fragment was determined by cleavage with trypsin into alanylvalyllysine and lysyltyrosine. The intermediate chymotryptic fragment, had an N-terminal residue of leucine and was cleaved by proteinase K by the method of Wiegers et al (Biochem. Biophys. Res. Comm., 44, 513-519, 1971), into leucylasparagine and serylisoleucylleucine, and by thermolysin into leucylasparaginylserine and isoleucylleucine. As a result of these determinations, it was determined that the amino acid sequence of the octacosapeptide V.I.P. is as follows:

His-Ser-Asp-Ala-Val-Phe-Thr-Asp-Asn-Tyr-Thr-Arg-Leu-Arg-Lys-Gln-Met-Ala-Val-Lys-Lys-Tyr-Leu-Asn-Ser-Ile-Leu-Asn-NH$_2$.

BIOLOGICAL ACTIONS OF V.I.P.

The newly isolated polypeptide VIP has a wide variety of biological actions as indicated in several animal species. Most of the experiments have been conducted in anesthetized dogs (anesthetic: pentobarbital or chloralose/urethane); some effects have also been confirmed in other species.

A. The Cardiovascular system

1. Peripheral (Systemic) Vasodilation

This is one of the major effects of the peptide and is the basis for bioassay through the process of purification. The vasodilatory effect was measured by recording the femoral arterial blood flow (electromagnetic probe) during the infusion of the peptide into a branch of the same femoral artery. Flow increased by 50% with the infusion of 40 ng/kg of the peptide. Vasodilation was also seen in the superior mesenteric and hepatic arterial beds following local infusion of the peptide. Infusion into the renal artery, however, resulted in either no change or an actual decrease in blood flow.

2. Blood Pressure

Intravenous or intra-arterial infusion of VIP usually resulted in a fall in mean systemic arterial blood pressure, as monitored by a transducer attached to an aortic catheter. This hypotension was observed with all but the smallest doses; for example, 400 ng/kg reduced mean blood pressure by approximately 15 mm Hg. The hypotensive effect has also been shown in normal rabbits and rats and in the special breed of "spontaneously hypertensive rats."

3. Pulmonary Vasodilation

It has been found that the vasodilatory action of VIP extends also to the pulmonary vessels. This has been demonstrated in isolated lung lobes perfused at a constant flow with Krebs' solution. The vasodilatory action is demonstrable even in the presence of normal pulmonary arterial pressure, but is more noticeable if this pressure has been raised previously, as by hypoxic (8% oxygen) breathing, or by the infusion of histamine or nor-epinephrine into the same lobe. This action was not mediated by $\beta$-adrenergic stimulation or by $\alpha$-adrenergic blockade.

4. Splanchnic Vasodilation

Infusion of VIP into the hepatic or the superior mesenteric artery leads to increased blood flow in these arteries, despite the associated fall in mean arterial blood pressure.

5. Cardiac Effects: Positive Inotropic Action

A positive inotropic action for VIP has been demonstrated in two types of preparations; intact, anesthetized dog and isolated papillary muscle from cat or dog heart.

In the intact dog, where heart action was paced electrically, intravenous injections of VIP in doses too small to lower blood pressure (0.05–0.2 $\mu$g/kg), increased left ventricular dP/dt, even though left ventricular end-diastolic pressure decreased or remained unchanged.

Myocardial contractility, as measured by the force of isometric contraction of cat or dog papillary muscle, also increased. This positive inotropic effect of VIP was comparable to, and often stronger than that of glucagon, but weaker than that of isoproterenol.

No chronotropic action was demonstrable on isolated rat atrial muscle.

VIP has also indicated coronary vasodilator activity, which implies possible usefulness as a coronary dilator. Thus the polypeptide has potential for use in the treatment of coronary angina pectoris. In this field of use, administration could be sublingually, that is, by inserting a capsule under the tongue.

B. The Respiratory System

Besides the (1) vasodilatory action on pulmonary vessels, described above, VIP has the following effects on the respiratory system:

2. Respiratory Stimulation

Doses of 0.9 $\mu$g/kg, infused into common carotid artery enhanced respiratory frequency (68%), and to a lesser extent, tidal volume (0.4%), resulting in hyperventilation, a fall in arterial blood $P_{CO_2}$ and a rise in arterial $P_{O_2}$.

3. Relaxation of Bronchial Smooth Muscle

This action was demonstrated on isolated trachea of quineapig, perfused with Krebs' solution. This relaxant effect was not affected by $\beta$-adrenergic blockade.

4. Bronchodilation

VIP is also of use as a bronchodilator for use in the treatment of asthma and related conditions. As a bronchodilator, the preferred method of use would be by inhalation as with an aerosol or nasal spray although other methods can be used if desired.

C. Carbohydrate Metabolism:

1. Hyperglycemia

Infusions of VIP (1 $\mu$g/kg, intravenously or intra-arterially) in dogs led to elevation of plasma glucose concentrations from 110 to 140 mg per 100 ml, an increase of 27.3 percent. The hyperglycemia induced by the same dose of glucagon was from 108 to 196 mg. per 100 ml., an increase of 81.5 percent.

2. Glycogenolysis

Incubation of VIP with slices of rabbit liver stimulated glycogenolysis, by approximately 60 percent as did the same doses of glycagon in the same system.

D. Smooth Muscle-Relaxant Activity

Addition of VIP to Krebs' solution "superfusing" isolated smooth muscle preparations caused relaxation of these tissues: rat stomach strip, rat colon, guinea-pig trachea (mentioned earlier, under B), guinea-pig gallbladder, chick rectum, and chick rectal cecum. In no case was the relaxation affected by antagonists of histamine, serotonin acetylcholine, $\alpha$- or $\beta$- adrenergic receptors (4).

VIP contracted only one smooth-muscle tissue, guinea pig ileum.

E. When VIP was infused into a carotid artery of anesthetized dogs, the electroencephalographic pattern was changed in a manner showing lighter sleep, i.e., a tendency to wakefulness. The minimal effective doses were, however, larger than those required to stimulate respiration or decrease arterial blood pressure.

THERAPEUTIC APPLICATIONS OF V.I.P.

1. The potent vasodilator action suggests usefulness in promoting peripheral blood flow in extremities, and in relieving pulmonary hypertension in disease states associated with constriction of pulmonary vessels and in the relief of coronary angina pectoris.

2. Because of its hypotensive action, the polypeptide suggests usefulness as an additional tool in the management of systemic hypertension.

3. The myocardial-stimulant action points to the polypeptide as a useful agent in the supportive treatment of certain cases of congestive heart failure. Glucagon has been used for such purposes, and VIP promises to be more useful in this regard, at least in some cases especially where reduction of arterial blood pressure is desirable.

4. The smooth-muscle relaxant properties of the polypeptide render it useful in the management of excessive contractions of certain organs such as gallbladder.

5. The stimulant effect of VIP on respiration and on the central nervous system suggests that it is useful as a respiratory stimulant and as an analeptic agent.

DOSAGE AND ADMINISTRATION

It is recommended that the dosage to humans or animals be by intravenous injection of 0.02–10 µg VIP/kg of body weight for most biological conditions. The carrier may be any physiologically safe and unreactive solvent, many of which are well known in the art. Among those considered useful are the normal saline solutions, THAM solution, a solution of Tris(hydroxymethyl)amino-methane and others. The concentration of VIP in the carrier may vary widely, e.g. from 0.001 to 0.10 weight percent. However, VIP may also be administered by other methods such as by oral administration, by nasal spray, aerosol spray for bronchodilation, or sublingually for coronary dilation.

PROCESS OF OBTAINING V.I.P.

Secretin has been obtained from hog intestines in accordance with a method discovered by one of the co-inventors of this invention, "Preparation of Highly Purified Secretin," *Arkiv f. Kemi* 15, 8 (1959). The same procedure provides the starting material for this invention.

It should be understood that the starting material for the present invention contains secretin and VIP (vasoactive intestinal polypeptide), when prepared in accordance with the Mutt procedure outlined in the above-cited publication, but this is only typical of the material that may be used as the starting material. Any procedure that extracts secretin and VIP having high vaso activity would be suitable as starting material. The starting material, though not the only one acceptable, would be that as outlined in the above-mentioned article through page 72, line 11.

In the article by the present inventors in *Nature* 225,5235, pps. 863–864, Feb. 24, 1970, the starting material obtained from the Mutt procedure was chromatographed on carboxymethyl cellulose (CMC). Further purification was obtained through gel chromatography and the column of Sephadex. It was presumed that the product from these two chromatography separations would be sufficient to obtain a purified product. However, further experimentation led to the discovery that special purification procedures were necessary since the product disclosed in the *Nature* article was found not to be pure.

It was discovered that the crude VIP and secretin must first be subjected to a first ion-exchange chromatography followed by separation by gel chromatography, thereafter followed by a second ion exchange chromatography separation and finally a countercurrent distribution separation.

The first ion-exchange chromatography separation as well as the second ion-exchange chromatography separation utilize CMC, though other ion-exchange media may be utilized. The buffer may be for instance, ammonium bicarbonate or sodium phosphate. The concentration of the buffer is not critical but preferably may vary between approximately 0.01 and 0.015M. The pH of the buffer solution should be between 7 and 9, preferably between 7.8 and 8.2. The crude polypeptide containing secretin and VIP is dissolved in the buffer and passed onto the column of CMC. FIG. 1 illustrates the optical density at 280 nm of the various fractions collected. Fractions 9 through 18 contain the bulk of the secretin activity. All of the vasoactivity of the various fractions throughout this invention were determined by infusing various fractions into the femoral artery of the dog's leg, and measuring the blood flow in that artery.

The fractions containing crude VIP include those fractions beginning approximately after the last of the secretin has been removed, and in any event those fractions having an optical density within the first peak after the passage of the secretin. In the example, fractions 20 through 25 are collected to obtain all of the VIP when eluted withh a dilute mineral acid, particularly dilute aqueous hydrochloric acid. The obtained VIP is then converted to the acetate and freeze-dried.

Figure 2:
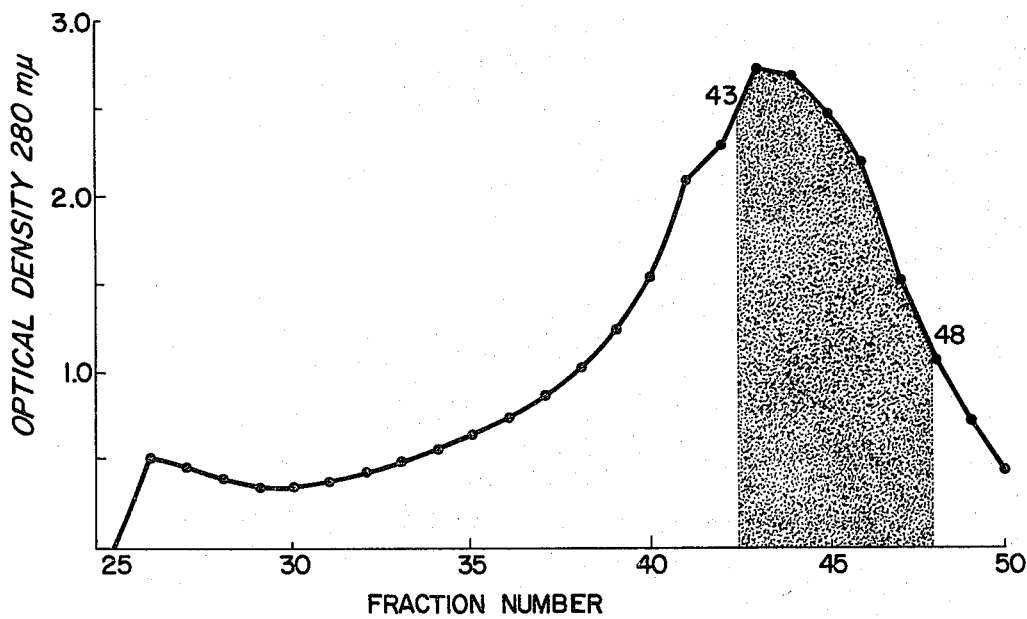

After the first ion-exchange separation made on the basis of the acidity or basicity of the polypeptides, a gel chromatography separation is utilized to separate the various polypeptide molecules in accordance with their size. The column may be Sephedex, which is a well-known cross-linked dextran frequently used for this purpose, or biogel or a like gel filtration medium. The crude VIP from the previous and first ion-exchange chromatography is dissolved in an organic acid such as acetic acid. The concentration of the acid is not critical but may vary from approximately 0.1M to 0.3M. the preferred organic acid is acetic acid. FIG. 2 illustrates the optical density of the fractions at 280 nm. The fractions should be collected at approximately the highest portions of the peak of the optical density curve. In the example, fractions 43 through 48 were collected and found to contain the crude VIP. These fractions were combined and freeze-dried.

The crude VIP contained in the freeze-dried product was now ready for the second ion-exchange chromatography on CMC. The crude VIP was dissolved in ammonium bicarbonate and the pH adjusted between pH 7–9, preferably pH 7.8–8.2.

The buffer preferred is ammonium bicarbonate; however, any of the buffers previously mentioned in connection with the first ion-exchange chromatography may be utilized.

The concentration of the buffer may be 0.05M to 0.15M approximately; as previously stated, the concentrations are not critical.

Figure 3:
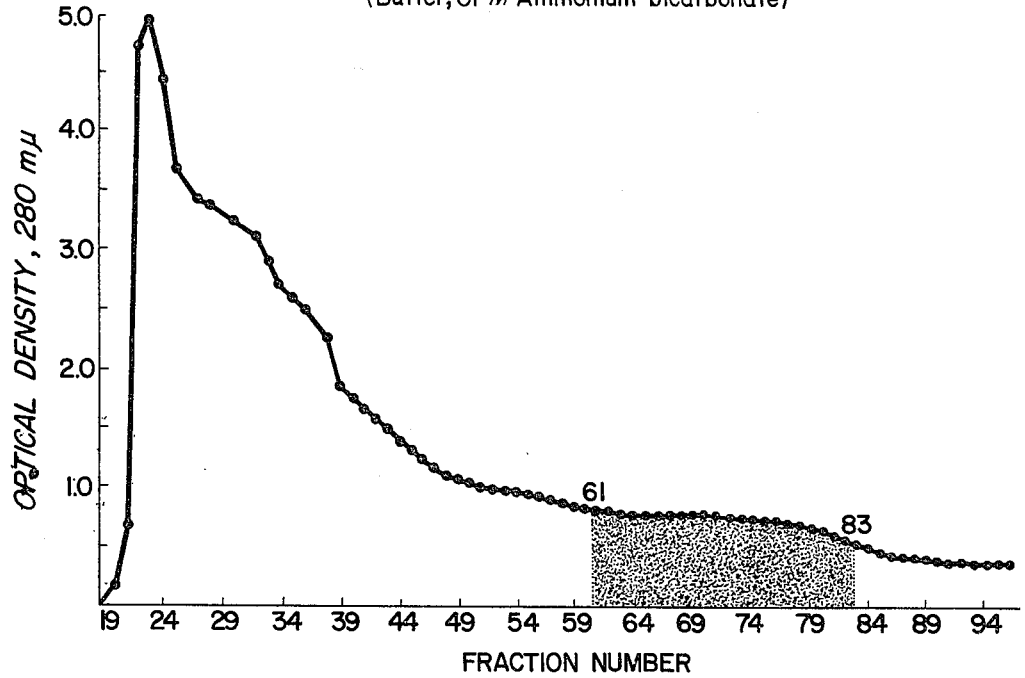

The fractions that were obtained exhibited an optical density as shown in FIG. 3. By testing the vaso activity, there was discovered that the fractions should be collected beginning at about one-fourth to one-fifth of the peak value of the optical density down to approximately one-tenth of the peak value. The crude VIP so obtained from the fractions are shown to be fractions 61 through 83 and were combined and freeze-dried.

The final essential purification was discovered to be a countercurrent distribution separation. The systems preferred included an organic solvent, for example: alcohols such as 1-butanol, that give a two-phase system with aqueous solvents, preferably aqueous solutions of alkali metal or ammonium bicarbonates, phosphates, etc; for example, potassium or sodium phosphates or ammonium bicarbonates. At least a 20 tube separation system should be used, but a several hundred tube system or even greater is preferable.

Concentration of the ammonium bicarbonate may vary from 0.05M to 0.15M. Again, the concentrations are not critical.

Figure 4:
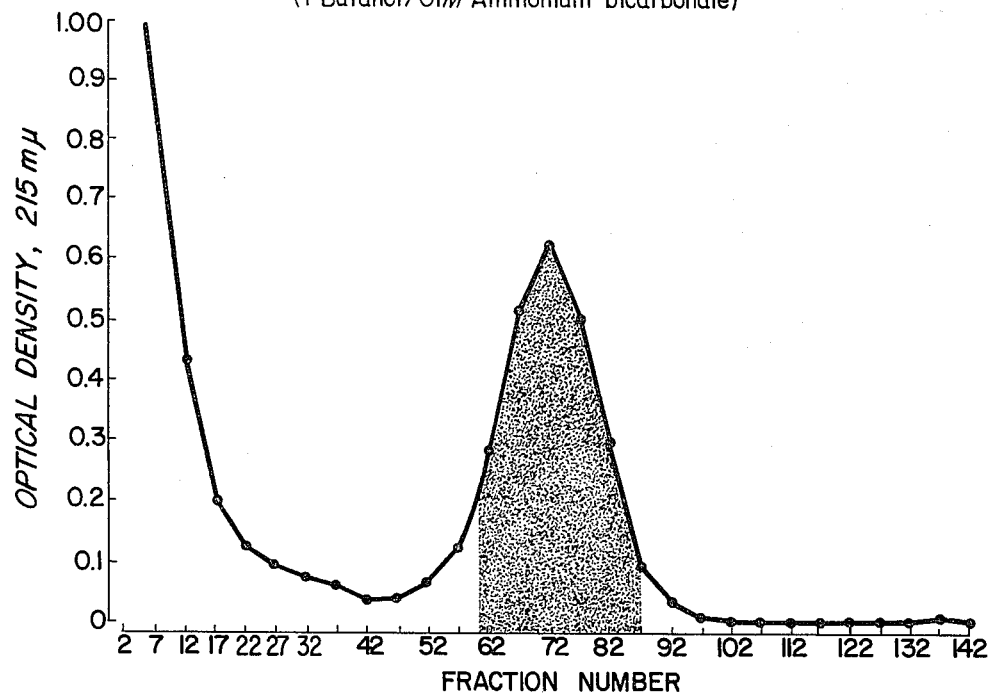

The collections were made on the basis of the optical densities of the homogenous tube contents as determined at 215 nm. Collections were made of those fractions illustrating the optical density covering the first full peak in the optical density curve as shown in FIG. 4. The fractions contained substantially pure VIP recoverable from the solution as disclosed in the example. When freeze-dried, a substantially pure VIP product was obtained. The product so obtained, was found to be adequate for biological active dosage.

EXAMPLE

Preliminary Separation

The uppermost metre of hog intestine was removed from the animals as soon as possible, cleansed of the bulk of adhering fatty tissue, emptied of its contents and flushed with cold water. It was then immersed, without being everted, for 5–10 minutes in vigorously boiling water. The boiled intestines were stored at about −15°C. for not longer than one-month. They were worked up in batches of 1000 intestines each. The intestines in such a batch weighed about 70 kg. They were minced in the frozen state and extracted with constant stirring overnigth at room temperature with 200 litres of 0.5 N acetic acid. Tap water was used for diluting the glacial acetic acid. Two kg of Hyflo Super-Cel was then added to the extraction mixture, and the resulting suspension filtered through bags of linen cloth. The filtrate was stirred with 2 kg of alginic acid, which had previously been washed with water, 0.2 N HCl, and water again. The alginine acid containing the adsorbed VIP was allowed to sediment for a few hours. The supernatant was discarded, and the sediment transferred to suction filters, on which it was washed with 0.005 N HCl and then with 95% ethanol to remove the fats. The ethanol was either allowed to evaporate, or washed off with 0.005 N HCl. The VIP was eluted from the alginic acid with 20 litres of 0.2 N HCl under stirring for one hour. After filtering, the active material was precipitated from the eluate with sodium chloride at saturation. The precipitate was collected on a suction filter and sucked as dry as possible.

The precipitate was dissolved in water at room temperature to a concentration of 5 g per 100 ml solution. Two volumes of 95% ethanol were added and the pH of the solution, determined electrometrically, brought to 7.2 with a mixture of one part of 1 N NaOH and two parts of 95% ethanol. The precipitate that formed was filtered off on fluted paper (Whatman 3MM) and discarded. The clear filtrate was diluted with an equal volume of 0.15% acetic acid, 100 g of alginic acid, which had been prewashed with 0.2 N HCl and then with water, was suspended in the diluted filtrate. After stirring for one hour at room temperature, the alginic acid containing the adsorbed VIP was collected on a suction filter and washed on the filter with 0.005 N HCl. The filtrate and washings were discarded. Elution of the VIP from the alginic acid was carried out under stirring for 10 minutes with 1.5 litres of 0.2 N HCl. The alginic acid was filtered off and washed with water. The eluate was saturated with sodium chloride. The precipitate that formed was collected on a suction filter. It weighed 20.5 g and contained 9.0% N. The precipitate was dissolved in water to a concentration of 5 g per 100 ml. and the pH of the solution brought to 7.2 with 0.1 N NaOH. A precipitate formed 2 g of Hyflo Super-Cel, prewashed with 2 N HCl and water and dried at 150°C., were added to every 100 ml of the solution, and the mixture filtered with suction. The filter cake was discarded, the clear filtrate brought to pH 4.5 with N HCl, and saturated with sodium chloride. The precipitate that formed was collected on a suction filter. It was covered on the filter with a layer of soft plastic and sucked as dry as possible.

This precipitate was triturated for 15 minutes at +4°C. with 50 ml of methanol per g precipitate. The suspension was filtered on a suction filter. The undissolved material, which contained cholecystokinin and pancreozymin, was washed on the filter with methanol and ether. The air-dry material weighed 5 g. It was stored for later use. The filtrate was brought to about pH 7.5 (glass electrode) with 0.1 M NaOH in methanol. The precipitate that formed was filtered off on fluted paper and discarded. The filtrate was brought to pH 6.0 with 0.1 M HCl in methanol, and precipiated with 2 volumes of ether precooled to −15°C. The precipitate that formed was collected at −15°C. on a suction filter, and washed on the filter with ether. It was then dissolved to a 2% solution in water, and the solution saturated with sodium chloride. The precipitate was collected on a suction filter on hardened paper, which had been moistened with a saturated solution of sodium chloride in water.

This precipitate constitutes the starting material for the subsequent separation techniques. As outlined above, the method follows precisely that disclosed by Mutt for the purification of secretin.

Chromatographic Separation

The First CMC Column 450 g of CMC was washed sequentially with ethanol, water, 0.2 M HCl and 0.1 M NaOH. It was then suspended in 10 litres of the latter solution and allowed to sediment for one hour. The supernatant, containing "fines" was poured off and the procedure of suspending and decanting repeated once. The CMC was washed again with 0.2 M HCl and, suspended in this, was poured into a chromatographic tube, 14 × 40 cm. The glass tube, made by Messrs. Werner-Glas, Stockholm, had a flat, perforated bottom which was covered by a layer of nylon netting and the cloth. The netting and cloth were held in position by a disc of perforated teflon, fitting firmly into the tube. After setting, the top of the column was covered with a layer of nylon cloth, held in position by a perforated procelain disc. To prevent toppling, a glass rod, directed vertically upwards, was attached to the middle of the disc, and to this rod two other rods, each slightly shorter than the diameter of the tube, were attached crosswise, about ten cms above the plane of the disc. The column was washed with 0.1 M NaOH and kept under this solution until required for chromatography.

First Chromatography on CMC

The column was washed with a 0.0125 M sodium orthophosphate buffer of pH 8 ± 0.1, containing EDTA and tricresol. The composition of the buffer was: 44.77 g $Na_2HPO_4.12H_2O$, 3.70 g disodium EDTA and 20 ml tricresol (distilled, colorless), in water to a volume of ten litres. Before use, the buffer was clarified by filtration through "Millipore" filters of 0.45U porosity. The column was usually kept under this buffer overnight. It was then equilibrated with a buffer containing the same amount of disodium orthophosphate in ten litres but with the EDTA and tricresol replaced by 500 ml of dimethyl formamide. The pH was adjusted to 8 ± 0.1 by the addition of about 7 ml of 1 M $H_3PO_4$. This buffer, too, was filtered immediately before use. After equilibration, the column had the dimensions 14 × 14 cm. Twelve g of the starting material was dissolved in 480 ml of buffer and the pH of the solution was brought to 8 ± 0.1 by the addition of about 590 ml of 0.02 M NaOH which contained 50 ml/litre of dimethyl formamide. A slight precipitate formed. It was filtered off on fluted Munktell 00 with the aid of 20 g of Hyflo Super Cel and discarded. The clear solution was allowed to sink into the column and the chromatogram was developed with the buffer at a flow rate of 100 ml/min. Fractions of 500 ml each were collected. After the 18th fraction, starting with the introduction of the polypeptide solution into the column, the eluant was changed to 0.2 M HCl and more fractions were collected. FIG. 1 shows the optical density at 280 mu of the fractions. Fractions 9–18 contained all of the secretin activity. Fractions 22–25 were obtained after all fractions containing secretin were first obtained as illustrated in FIG. 1. These fractions 22–25 were combined and diluted to 20 litres with water. 120 G (wet weight) of alginic acid was suspended in the solution and the mixture stirred for 15 minutes. The alginic acid, carrying the absorbed polypeptide material, was allowed to settle and was then collected on a suction filter and washed thoroughly with ice-cold 0.005 M HCl. The polypeptides were eluted with 900 ml of ice-cold 0.2 M HCl, added in portions of 100 ml each. The eluate, followed by 0.2 M acetic acid, was passed through a 6 × 17 cm column of DEAE-Sephadex in acetate form and the polypeptide-containing, chloridefree effluent was lyophilized. The lyophilized material weight 1.8 g.

The Sephadex G-25 Column

Sephadex G-25 fine, was washed sequentially with ethanol, 0.1 M NaOH, 0.2 M HCl, and 0.2 M acetic acid containing 3 ml/litre of tricresol. A quantity of sephadex, suspended in the latter solution, and sufficient to give an 80 cm column after settling, was poured into a 10 × 100 cm glass tube fitted with a packing reservoir (Pharmacia K 10/100 and R 100). The column was stored under the tricresol-containing acetic acid until required for chromatography.

Chromatography on Sephadex G-25

The column was washed with 0.2 M acetic acid until free of tricresol. 4.6 G of material of the type obtained by chromatography on CMC as described in the previous section was dissolved in 46 ml of 0.2 M acetic acid, filtered through a "Millipore" filter and allowed to sink into the column. Elution was carried out with 0.2 M acetic acid at a flow rate of 50 ml/min. Fractions of 100 ml each were collected, starting with the introduction of the polypeptide solution into the column. FIG. 2 shows the optical density of the fractions at 280 mu. Fractions 43–48 collected at the greatest optical density as shown in FIG. 2 and were combined and lyophilized. The lyophilized material weight 1.2 g.

The Second CMC Column

50 G CMC was washed as described for the first column but then poured into a tube 5 × 40 cm, and stored under 0.1 M $NH_3$.

Second Chromatography on CMC

The CMC column was equilibrated with 0.1 M $NH_4$ $HCO_3$. After equilibration, it had the dimensions 5 × 17 cm. 2 G of the material obtained as described in the preceding section was dissolved in 7 ml of water, and 7 ml of 0.2 M $NH_3$ followed by ml of 0.1 M $NH_4$ $HCO_3$ were added and the pH was adjusted to 8 ± 0.1 with 0.1 M $NH_3$ (about 1 ml). The solution was clarified by filtration through a "Millipore" filter and allowed to sink into the CMC column. Elution was carried out with 0.1 M $NH_4$ $HCO_3$, at a flow rate of 14 ml/min. Fractions of 14 ml each were collected. FIG. 3 shows the optical density of the fractions at 280 mn and 1 cm light path. Fractions 61–83 were collected beginning at approximately one-fourth to one-fifth the peak value of the greatest optical density as illustrated in FIG. 3. These fractions were combined and lyophilized. The lyophilized material weighed 230 mg.

Countercurrent Distribution

217 Mg of the material obtained as described in the preceding section was subjected to countercurrent distribution in the apparatus (from H. O. Post, Inc., Middle Village, N.Y., U.S.A.) with an inert argon atmosphere. The phase system is butanol- 1/0.1 M $NH_4$ $HCO_3$. After completion of the 200 tube transfer, the two phases in each tube were made to coalesce by the addition of 3 ml of ethanol. The optical densities of the homogenous tube contents were determined at 215 mn and 1 cm light path. The values obtained are given in FIG. 4. Collection of the contents of tubes 60–85 at the first full peak of the optical density curve were combined and dissolved in 20 volumes of water. The pH of the solution was brought to 2.5–2.7 with HCl and the polypeptides were recovered from solution by adsorption to alginic acid, elution with 0.2 M H Cl and exchange of chloride for acetate, followed by lyophilization. The lyophilized material weighed 45 mg. and may be considered the final product although further purification may be made.

The material obtained by countercurrent distribution above showed one strong and one faint band when analyzed by polyacrylamide gel-electrophoresis. At least seven bands were visible in the preparation immediately preceding the countercurrent step. Analysis for N-terminal amino acid, by the phenylisothiocyanate method revealed only one such acid, histidine. Tryptophan and cystine/cysteine were absent as shown by the Voisnet-Rhode dimethylaminobenzaldehyde reaction, and by analysis of performic acid-oxidized material. These observations indicated the material to be sufficiently pure for work on the structure of VIP. Acid hydrolysis and two-dimensional paper chromatographic analysis of the hydrolysate showed, however, that two of the amino acids in the hydrolysate, glycine and proline, occurred in much lower amount than any of the others, and consequently, were derived from contaminating polypeptide material. On chromatography of the highly purified preparation from the countercurrent distribution on Sephadex G-25, fine, in 0.2 M acetic acid (20 mg polypeptide on a 0.9 × 140 cm column), the material from the fringe fractions of the polypeptide-containing part of the eluate contained distinctly more glycine and proline than material from the middle fractions. Table 1 shows the results of the analysis of an acid hydrolysate of 470 micrograms of the latter type of material.

TABLE 1

Amino Acid Analysis of VIP

| Amino Acid Residue | Amount in Micromolar Per 470 Micrograms Polypeptide | Probable Number Of Residues In VIP |
| --- | --- | --- |
| Ala | 0.260 | 2 |
| Arg | 0.260 | 2 |
| Asp | 0.580 | 5 |
| Glu | 0.145 | 1 |
| Gly | 0.018 | 0 |
| His | 0.115 | 1 |
| Ile | 0.126 | 1 |
| Leu | 0.380 | 3 |
| Lys | 0.371 | 3 |
| Met | 0.093 | 1 |
| Phe | 0.124 | 1 |
| Pro | traces | 0 |
| Ser | 0.260 | 2 |
| Thr | 0.260 | 2 |
| Tyr | 0.200 | 2 |
| Val | 0.250 | 2 |
| TOTAL | | 28 |

What is claimed is:

1. A therapeutic composition comprising about 0.001 to 0.1 weight percent of the polypeptide, V.I.P., having the following amino acid sequence:

L-His-L-Ser-L-Asp-L-Ala-L-Val-L-Phe-L-Thr-L-Asp-L-Asn-L-Tyr-L-Thr-L-Arg-L-Leu-L-Arg-L-Lys-L-Gln-L-Met-L-Ala-L-Val-L-Lys-L-Lys-L-Tyr-L-Leu-L-Asn-L-Ser-L-Ile-L-Leu-L-Asn-NH$_2$ and a physiologically acceptable carrier.

2. A method for producing cardiovascular, respiratory, metabolic and smooth muscle-relaxant biological actions in animals and humans comprising administering thereto a therapeutically effective amount of the polypeptide V.I.P. having the following amino acid sequence:

L-His-L-Ser-L-Asp-L-Ala-L-Val-L-Phe-L-Thr-L-Asp-L-Asn-L-Tyr-L-Thr-L-Arg-L-Leu-L-Arg-L-Lys-L-Gln-L-Met-L-Ala-L-Val-L-Lys-L-Lys-L-Tyr-L-Leu-L-Asn-L-Ser-L-Ile-L-Leu-L-Asn-NH$_2$.

3. A method according to claim 2 wherein about 0.02 to 10 μg of the V.I.P. per kg of body weight is administered.

4. A method according to claim 3 wherein the V.I.P. is in combination with a physiologically acceptable carrier.

5. A method according to claim 3 wherein administration is by intravenous injection.

6. A method according to claim 4 wherein the carrier is a normal saline solution or a solution of Tris(hydroxymethyl)amino-methane.

7. A method according to claim 2 wherein the biological action is systemic, pulmonary or splanchnic vasodilation.

8. A method according to claim 2 wherein the biological action is hypotension.

9. A method according to claim 2 wherein the biological action is increased cardiac output.

10. A method according to claim 2 wherein the biological action is respiratory stimulation.

11. A method according to claim 2 wherein the biological action is hyperglycemia.

12. A method according to claim 2 wherein the biological action is bronchodilation.

13. A method according to claim 12 wherein the V.I.P. is administered by inhalation.

14. A method according to claim 2 wherein the biological action is coronary dilation and the V.I.P. is administered sublingually.

* * * * *

UNITED STATES PATENT OFFICE
CERTIFICATE OF CORRECTION

PATENT NO. : 3,898,329
DATED : August 5, 1975
INVENTOR(S) : Sami I. Said and Viktor Mutt It is certified that error appears in the above-identified patent and that said Letters Patent are hereby corrected as shown below:

Column 1, line 55, change "Try" to --Tyr--;

Column 6, line 4, change "$P_{CO}$" to --$P_{CO_2}$--;

Column 6, line 5, change "$P_O$" to --$P_{O_2}$--;

Column 8, line 13, change "withh" to --with; and

Column 11, line 10, change "00 with" to --00 paper with--.

Signed and Sealed this seventeenth Day of February 1976

[SEAL]

Attest:

RUTH C. MASON
Attesting Officer

C. MARSHALL DANN
Commissioner of Patents and Trademarks